US012359778B2

(12) United States Patent
Svensson et al.

(10) Patent No.: US 12,359,778 B2
(45) Date of Patent: Jul. 15, 2025

(54) LIGHT SOURCE AND LIGHT FITTING

(71) Applicant: Inter IKEA Systems B.V., LN Delft (NL)

(72) Inventors: Greger Svensson, Killeberg (SE); Peter Åberg, Vinslöv (SE)

(73) Assignee: Inter IKEA Systems B.V., LN Delft (NL)

( * ) Notice: Subject to any disclaimer, the term of this patent is extended or adjusted under 35 U.S.C. 154(b) by 0 days.

(21) Appl. No.: 18/529,294

(22) Filed: Dec. 5, 2023

(65) Prior Publication Data

US 2024/0102620 A1 Mar. 28, 2024

Related U.S. Application Data

(63) Continuation of application No. 17/436,350, filed as application No. PCT/SE2020/050246 on Mar. 5, 2020, now Pat. No. 11,873,950.

(30) Foreign Application Priority Data

Mar. 7, 2019 (SE) .................................... 1950289-7

(51) Int. Cl.
*F21K 9/235* (2016.01)
*F21Y 115/10* (2016.01)

(52) U.S. Cl.
CPC ........... *F21K 9/235* (2016.08); *F21Y 2115/10* (2016.08)

(58) Field of Classification Search
CPC .......... F21K 9/235; F21K 9/233; F21K 9/238; F21Y 2115/10; F21Y 2105/10; H01R 33/9453; H01R 33/22; F21V 23/06
See application file for complete search history.

(56) References Cited

U.S. PATENT DOCUMENTS

| | | | |
|---|---|---|---|
| 5,816,695 | A | 10/1998 | Lin |
| 5,989,070 | A | 11/1999 | Al-Turki |
| 9,408,282 | B1 | 8/2016 | Springer |
| 10,753,595 | B1 | 8/2020 | Wan |

(Continued)

FOREIGN PATENT DOCUMENTS

| | | | |
|---|---|---|---|
| CN | 2358609 | Y | 1/2000 |
| CN | 1818456 | A | 8/2006 |

(Continued)

OTHER PUBLICATIONS

International Search Report for International Patent Application No. PCT/SE2020/050246 dated Apr. 21, 2020, 3 pages.

(Continued)

*Primary Examiner* — Tsion Tumebo
(74) *Attorney, Agent, or Firm* — Merchant & Gould P.C.

(57) ABSTRACT

The present disclosure relates to a light source comprising a housing, a light source connector at a first end of the housing, for connecting the light source to a light fitting, and a light emitting diode, LED, circuit, configured to emit light through a second end of the housing. The housing may be substantially symmetric about a symmetry axis extending from the first to the second end of the housing. The housing has, at the first end, a first end portion, comprising a thread, made in an insulating material, and being configured to be connected to a light fitting. A light fitting comprising such a light source is also considered.

15 Claims, 3 Drawing Sheets

(56) References Cited

U.S. PATENT DOCUMENTS

| | | | | |
|---|---|---|---|---|
| 10,816,144 | B2 * | 10/2020 | Ludwig | F21K 9/238 |
| 10,845,046 | B2 * | 11/2020 | Kohen | H01R 13/6276 |
| 2006/0098440 | A1 | 5/2006 | Allen | |
| 2006/0177193 | A1 | 8/2006 | Coushaine | |
| 2008/0174224 | A1 | 7/2008 | Liao et al. | |
| 2009/0185374 | A1 | 7/2009 | Wu et al. | |
| 2011/0234081 | A1 | 9/2011 | Adams | |
| 2012/0056557 | A1 | 3/2012 | Li et al. | |
| 2012/0218748 | A1 | 8/2012 | Conrad | |
| 2012/0218768 | A1 | 8/2012 | Hisano et al. | |
| 2013/0027938 | A1 | 1/2013 | Hisayasu | |
| 2013/0148338 | A1 | 6/2013 | Chen et al. | |
| 2013/0201668 | A1 | 8/2013 | Chien | |
| 2014/0043823 | A1 | 2/2014 | Liu et al. | |
| 2014/0265905 | A1 | 9/2014 | Ray | |
| 2014/0313735 | A1 | 10/2014 | Djajaatmadja et al. | |
| 2015/0062929 | A1 | 3/2015 | Mostoller et al. | |
| 2016/0053952 | A1 | 2/2016 | Kuti et al. | |
| 2016/0178134 | A1 | 6/2016 | Hsieh et al. | |
| 2016/0252217 | A1 | 9/2016 | Achterhuis | |
| 2017/0149188 | A1 | 5/2017 | Kaandorp | |
| 2017/0227170 | A1 | 8/2017 | Wang et al. | |
| 2017/0307142 | A1 | 10/2017 | Fang et al. | |
| 2018/0023785 | A1 | 1/2018 | Chien | |
| 2018/0023796 | A1 | 1/2018 | Jiang et al. | |
| 2018/0035518 | A1 * | 2/2018 | Cook | H05B 47/19 |
| 2018/0106458 | A1 | 4/2018 | Sowden | |
| 2019/0242569 | A1 | 8/2019 | Jiang et al. | |
| 2019/0264877 | A1 | 8/2019 | Grandadam | |
| 2019/0264878 | A1 | 8/2019 | Benshetrit | |
| 2019/0331304 | A1 | 10/2019 | Ion | |
| 2019/0341718 | A1 | 11/2019 | Yu | |
| 2021/0356109 | A1 * | 11/2021 | Nie | F21K 9/23 |

FOREIGN PATENT DOCUMENTS

| | | | |
|---|---|---|---|
| CN | 101539252 | A | 9/2009 |
| CN | 101719615 | A | 6/2010 |
| CN | 101799122 | A | 8/2010 |
| CN | 102003647 | A | 4/2011 |
| CN | 102097727 | A | 6/2011 |
| CN | 102384376 | A | 3/2012 |
| CN | 102906490 | A | 1/2013 |
| CN | 105782913 | A | 7/2016 |
| CN | 107532781 | A | 1/2018 |
| DE | 202010002401 | U1 | 6/2010 |
| DE | 102015121467 | A1 | 6/2016 |
| GB | 2490755 | A | 11/2012 |
| RU | 99657 | U1 | 11/2010 |
| TW | 201418616 | A | 5/2014 |
| WO | 2018/053519 | A1 | 3/2018 |

OTHER PUBLICATIONS

Extended European Search Report for corresponding European Application No. 20766937.5 mailed Oct. 13, 2022.

Office Action dated Feb. 28, 2024 for corresponding Chinese patent application No. 202080019847.8 (14 pages include English Translation).

* cited by examiner

LIGHT SOURCE AND LIGHT FITTING

This application is a continuation of U.S. application Ser. No. 17/436,350 filed on Sep. 3, 2021, which is a National Stage Application of PCT/SE2020/050246, filed 5 Mar. 2020, which claims benefit of Patent Application Serial No. 1950289-7, filed 7 Mar. 2019 in Sweden, and which applications are incorporated herein by reference. To the extent appropriate, a claim of priority is made to each of the above disclosed applications.

TECHNICAL FIELD

The present disclosure relates to a light source comprising a housing, a light source connector at a first end of the housing, for connecting the light source to a light fitting, and a light emitting diode, LED, circuit, configured to emit light through a second end of the housing, wherein the housing is substantially symmetric about a symmetry axis extending from the first to the second end of the housing.

The present disclosure further relates to a light fitting suitable for including such a light source.

BACKGROUND

Such a light source is described for instance in DE-202010002401-U1 which relates to a LED light source with a GU-10 connector having a twist-lock configuration. Such a connector has two pins with wide ends that are connected to a fitting by inserting the pins in keyhole slots and turning the light source until the pins reach a locked position. For safety reasons, such a light source should preferably be used inside an outer housing, such that the pins become protected and thereby cannot readily be reached from the outside.

Therefore, when a light source of this kind should be replaced, the user needs to look inside the outer housing to determine the orientation of the keyhole slots, insert the light source with correct determined orientation, and find the keyhole slots while obscured by the light source itself to correctly connect the replacing light source.

In practice, this is quite difficult for many end users.

A general problem in this technical field is how to provide a light source that is easier to replace.

SUMMARY

One object of the present disclosure is thus to provide a light source that is easier to replace. This object is achieved with a light source as defined in claim 1. More specifically, in a light source of the initially mentioned kind, the housing is provided, at said first end, with a first end portion, comprising a thread, which is made in an insulating material, and is configured to be connected to a light fitting.

Such a light source can be connected directly to a light fitting without using an outer housing, as there are no electrical parts exposed when the light source is connected. Therefore, the replacement can be made a lot easier.

The light source may comprise a second, preferably approximately cylindrical, end portion at the second end of the housing, which second end portion has a larger width than the first end portion. This provides a space suitable for containing a printed circuit board, PCB, comprising the LED circuit and optionally driving circuitry and other circuitry therefore.

An intermediate portion of the housing, between the first and second end portions, may have the shape of a frustum of a cone. This provides for easy and efficient attachment at the first end to a light fitting, including an easy grip for a person mounting the light source, and a good light output at the second end.

The LED circuit may be placed on a printed circuit board, which may be located in the second end portion and have a normal parallel with the symmetry axis.

An electric connector may be located in the first end portion, and is connected to the light emitting diode, LED, circuit. The electric connector may be at least partly surrounded by said thread. Thereby the thread, being made from an insulating material, provides an insulating cover around the electric connector. The electric connector may preferably have at least partly the shape of a cylinder and be adapted for electrical connection to a light fitting at an arbitrary rotational position. Thereby, only attaching the light source to a light fitting by mating threaded parts is needed to replace the light source.

A connector board, which may preferably be perpendicular to the printed circuit board, may be used to connect the electric connector to the printed circuit board.

A lens or diffusor may be placed on top of the printed circuit board in the second cylindrical portion.

The housing, including the thread, may be made in one piece in a plastic material, typically by injection molding.

The thread may typically be an outer thread.

The first end portion may be substantially cylindrical, and the thread may extend in the elongation thereof.

The housing may be circular symmetric about the symmetry axis.

A light fitting may comprise such a light source. The light fitting may have a light fitting connector portion comprising a thread configured to mate with the thread of the light source, and the light fitting connector portion may be substantially cylindrical with the same outer width as the first end portion of the light source. This gives a seamless transition to the light source, which is further improved if the light fitting connector portion and the first end portion of the light source have the same color.

The light source housing may make up the outer face of the light fitting at the end thereof. Thereby, the housing serves the dual purpose of being a part of the outer face of the light fitting and of housing the components of the light source, such as the light emitting diode, LED, circuit.

DETAILED DESCRIPTION

Figure 1:
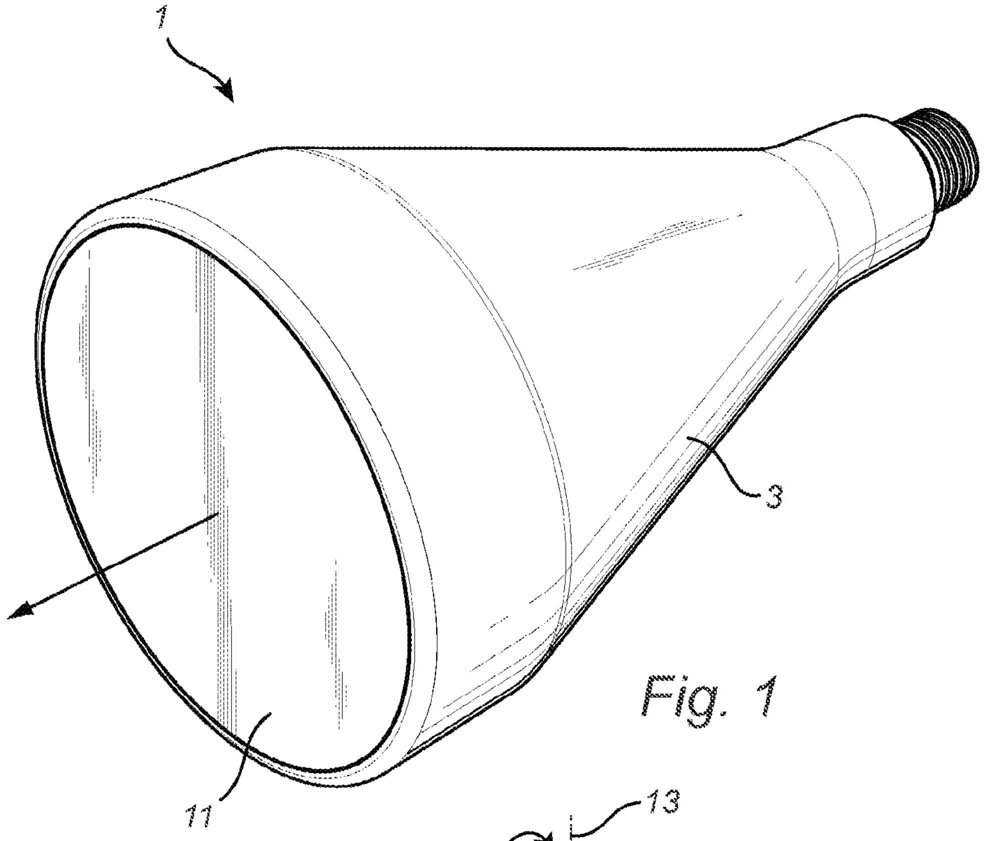
FIG. 1 shows a perspective view of a light source according to the present disclosure.
Figure 2:
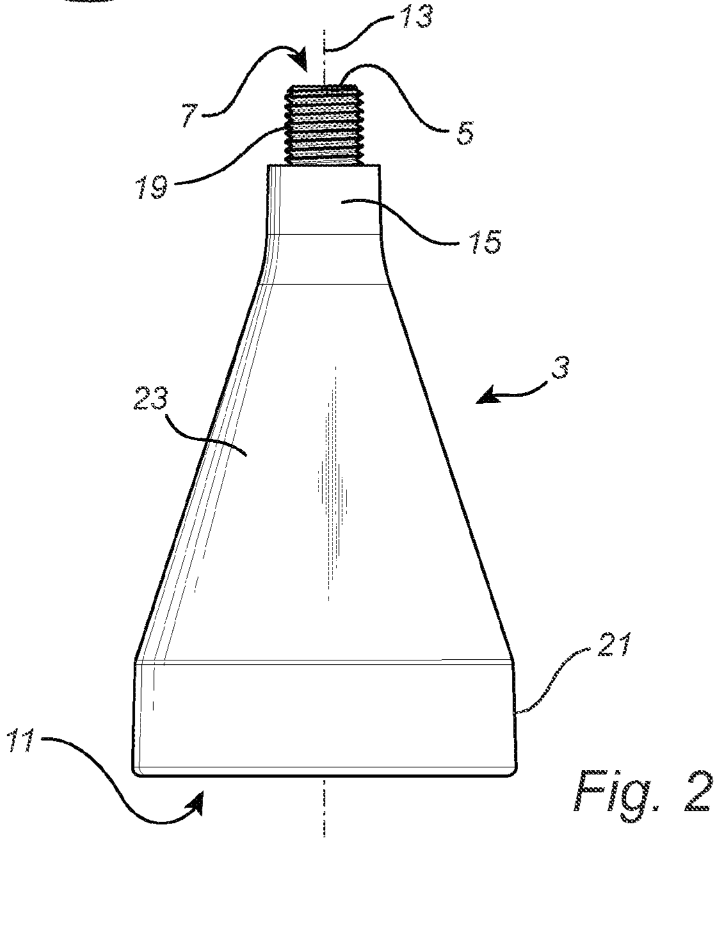
FIG. 2 shows a side view of the light source in FIG. 1.

The present disclosure relates to a light source and a light fitting including such a light source. FIG. 1 shows a perspective view of an example of such a light source 1. FIG. 2 shows a corresponding side view. The light source 1 comprises a housing 3, a light source connector 5, at a first end 7 of the housing 3, and is configured to emit light through a second end 11 thereof.

The housing 3 may be substantially symmetric about a symmetry axis 13 extending from the first to the second end 7, 11 of the housing 3. In the illustrated case, the housing 3 is circular symmetric about the symmetry axis 13. However other shapes are possible, for instance a housing cross section across the symmetry axis 13 may have a polygonal shape.

The light source comprises a light emitting diode, LED, circuit, which will be described in greater detail later.

The housing 3 comprises, at its first end 7, a first end portion 15, having a thread 19, in the illustrated case an outer thread, which is made in an insulating material, and is configured to be connected to a light fitting as will be shown. This is in contrast to known types of light sources, for instance of the types E27 or GU14, where a thread is provided but also being used as an electric connector of the light source. In the illustrated case, the thread does not have an electric function, but only a retaining function. The thread 19 may also have an insulating function. This means that no outer insulation need be provided at this location. Should the thread be exposed to some extent, the electric circuit connecting the light source to the light fitting is still protected.

The first end portion 15 may be substantially cylindrical with a cylinder axis coinciding with the symmetry axis 13 of the housing 3, and as illustrated the thread 19 may extend in the elongation of the first end portion 15. As will be shown, this configuration allows the light source to seamlessly constitute the elongation of a light fitting. The second end 11 of the housing 3 may comprise another approximately cylindrical end portion 21, having a larger width or diameter than the first end portion 15. This wider portion provides a suitable location for a LED circuit as will be shown.

An intermediate portion 23 of the housing 3, between the first 15 and second 21 end portions may be shaped as the frustum of a cone.

The housing 3, including the thread 19, may be made in one piece in a plastic material, typically by injection molding. Suitable materials include for example polyamide (PA), polycarbonate (PC), polypropylene (PP).

Figure 3:
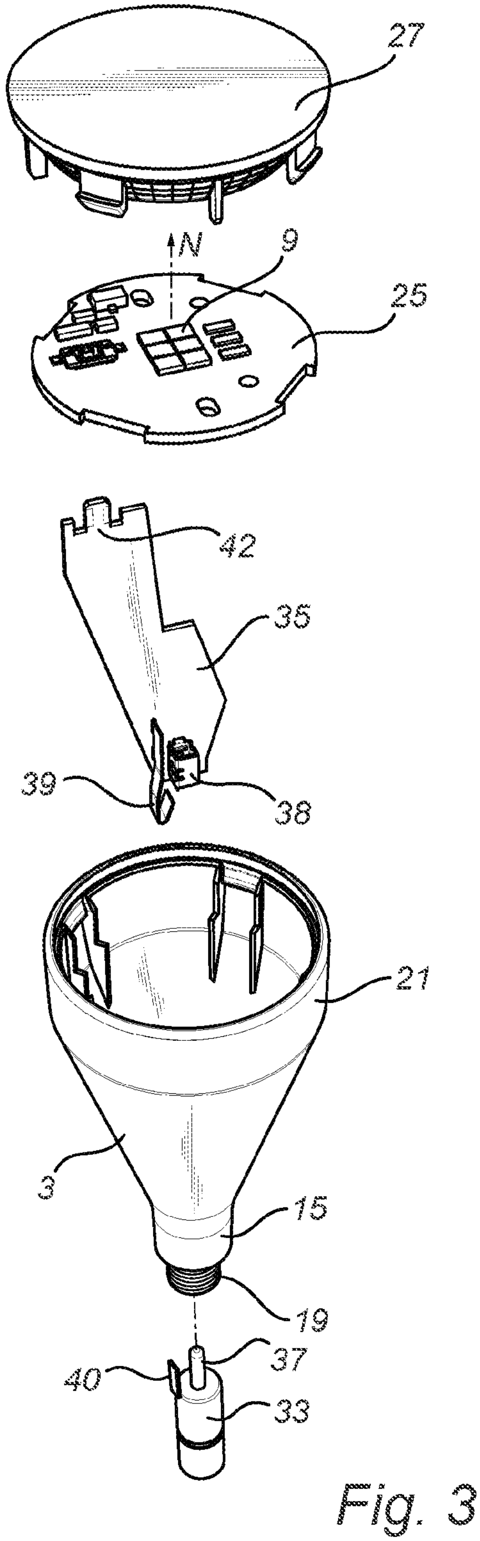
FIG. 3 shows an exploded view of the light source in FIG. 1.

FIG. 3 shows an exploded view of the light source 1 in FIG. 1. A LED circuit 9 of the light source 1 may as shown be placed on a printed circuit board, PCB, 25, including, in addition to light emitting diodes, driving and other electronics therefore. Preferably, the LED circuit PCB 25 is located in the wider second end portion 21 of the housing 3 where more space is provided. The PCB 25 may therefore extend in a plane and having a normal N being parallel with the symmetry axis 13 of the housing 3, the PCB 25 thereby directing the light emitted along that axis 13.

An electric connector 33 may typically be located in the first end portion 15. The connector 33 may be of a female coaxial power connector type having an inner opening providing room for a connecting pin of a light fitting male coaxial power connector. A pin may be provided in the center of this opening which in turn projects into a central opening of the light fitting male coaxial power connector, as is well known per se. The electric connector in its entirety may be hidden inside the first end portion, for example at least party inside of the thread 19, such that electric leads are not exposed when the light source is connected to a light fitting. The electric connector 33 may as illustrated have at least partly the shape of a cylinder and may be configured, thanks to the coaxial power connector configuration, for electrical connection to a light fitting at an arbitrary rotational position. This means that the connectors of the light source and the light fitting will swivel mutually while their threads are connected to each other.

A connector board 35, which may be perpendicular to the PCB 25, may be used to connect the electric connector 33 to the printed circuit board 25. As shown, a pin 37 of the connector 33 may be inserted in a sleeve 38 on the connector board 35. A bent sheet metal tab 39 may be connected to the connector board 35 at one end, while the other end of the tab 39 reaches into the space between the connector 33 and the housing 3 to contact a connector tab 40 of the connector 33. The other end 42 of the connector board 35 may be inserted in the PCB 25 to make contact between leads on the connector board 35 and the PCB 25.

As illustrated, a lens 27 may be placed on top of said printed circuit board 25 in the second cylindrical portion 21, although also a flat transparent layer or diffusor may be considered as alternative to a lens, for instance.

Figure 4:
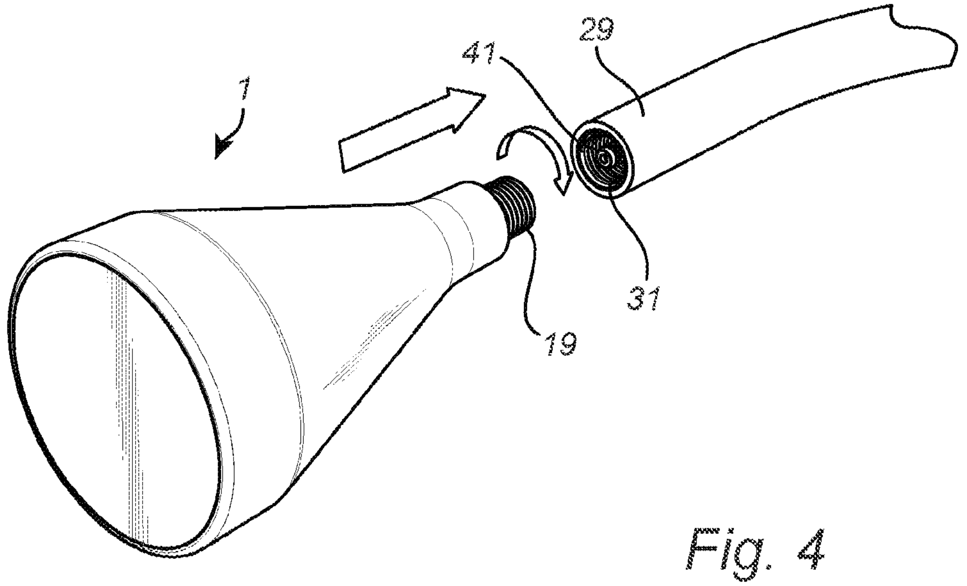
FIG. 4 illustrates a light source being connected to a light fitting.

FIG. 4 illustrates assembly of a light source 1 to a light fitting connector portion 29 of a light fitting. The light fitting connector portion 29 comprises an inner thread 31 configured to mate with the outer thread 19 of the light source 1. In the illustrated case, the light fitting connector portion 29 is substantially cylindrical with the same outer width as the first end portion 15 of the light source 1. Therefore, the light fitting comprises a light source 1 that seamlessly connects with the remainder of the light fitting. It is even possible to let the light fitting connector portion 29 and the first end portion 15 of the light source have the same color. The light fitting male coaxial power connector 41 is also indicated in FIG. 4.

Figure 5:
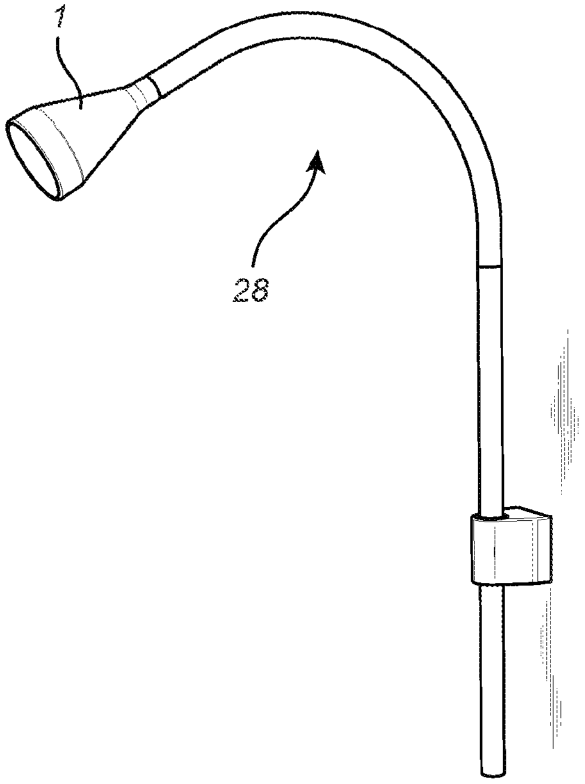
FIG. 5 shows a light fitting including a connected light source.

FIG. 5 shows a light fitting 28 including the connected light source 1 after the assembly illustrated in FIG. 4 has been completed. A power cord of known type, not shown in FIG. 5, may be used for connecting the light fitting 28 to electric power. The light source 1 housing 3 makes up the outer face of the light fitting 28 at the end thereof, meaning that no further light fitting shade is needed.

The present disclosure is not restricted to the above examples and may be varied and altered in different ways within the scope of the appended claims. For instance, instead of an outer thread 19 extending from the first end portion 15, there may be provided an inner thread in the first end portion that mates with an outer thread on the light fitting.

The invention claimed is:

1. A light source comprising a housing, a light source connector at a first end of the housing, for connecting the light source to a light fitting, and a light emitting diode, LED, circuit, configured to emit light through a second end of the housing, the housing having, at the first end, a first end portion comprising a thread being configured to be connected to the light fitting, and a light source coaxial power connector arranged at least partly inside the thread, said coaxial power connector having an inner arrangement for a connecting arrangement of a light fitting coaxial power connector, the light source coaxial power connector arrangement and the light fitting coaxial power connector arrangement having a female to male connection, and the light fitting, wherein the light fitting has a light fitting connector portion comprising a thread configured to mate with the thread of the light source, and wherein the light fitting connector portion is substantially cylindrical with a same outer width as the first end portion of the light source.

2. Light source according to claim 1, wherein the light source coaxial power connector is a female coaxial power connector and said light fitting coaxial power connector is a male coaxial power connector, said female coaxial power connector having an inner opening providing room for a connecting pin of the light fitting male coaxial power connector.

3. Light source according to claim 1, comprising a second, preferably approximately cylindrical, end portion at the second end of the housing, the second end portion having a larger width than the first end portion.

4. Light source according to claim 3, wherein an intermediate portion of the housing, between the first and second end portions, has the shape of a frustum of a cone.

5. Light source according to claim 3, wherein the LED circuit is placed on a printed circuit board, the printed circuit board being located in the second end portion and having a normal being parallel with said symmetry axis, wherein preferably a lens is placed on top of said printed circuit board in said second cylindrical portion.

6. Light source according to claim 1, wherein an electric connector is located in the first end portion and is connected to the light emitting diode, LED, circuit, preferably the electric connector being at least partly surrounded by said thread, the electric connector preferably having at least partly the shape of a cylinder and being adapted for electrical connection to a light fitting at an arbitrary rotational position.

7. Light source according to claim 5, wherein a connector, preferably a connector board, preferably being arranged perpendicular to the printed circuit board, connects the electric connector to the printed circuit board.

8. Light source according to claim 1, wherein the thread is made from an insulating material.

9. Light source according to claim 1, wherein the housing, including the thread, is made in one piece in a plastic material, such as polyamide, polycarbonate, or polypropylene.

10. Light source according to claim 1, wherein the thread is an outer thread.

11. Light source according to claim 1, wherein the first end portion is substantially cylindrical.

12. Light source according to claim 11, wherein the thread extends in the elongation of the first end portion.

13. Light source according to claim 1, wherein the housing is circular symmetric about the symmetry axis.

14. Light source according to claim 1, wherein the light fitting connector portion and the first end portion of the light source have the same color.

15. Light source according to claim 1, wherein the light source housing makes up the outer face of the light fitting at the end thereof.

* * * * *